June 4, 1968  W. SPÜHL  3,386,561
MACHINES FOR MANUFACTURING SPRING INTERIORS
Filed March 3, 1967  9 Sheets-Sheet 8
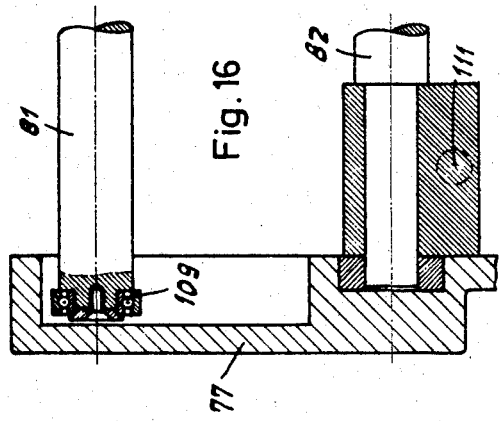
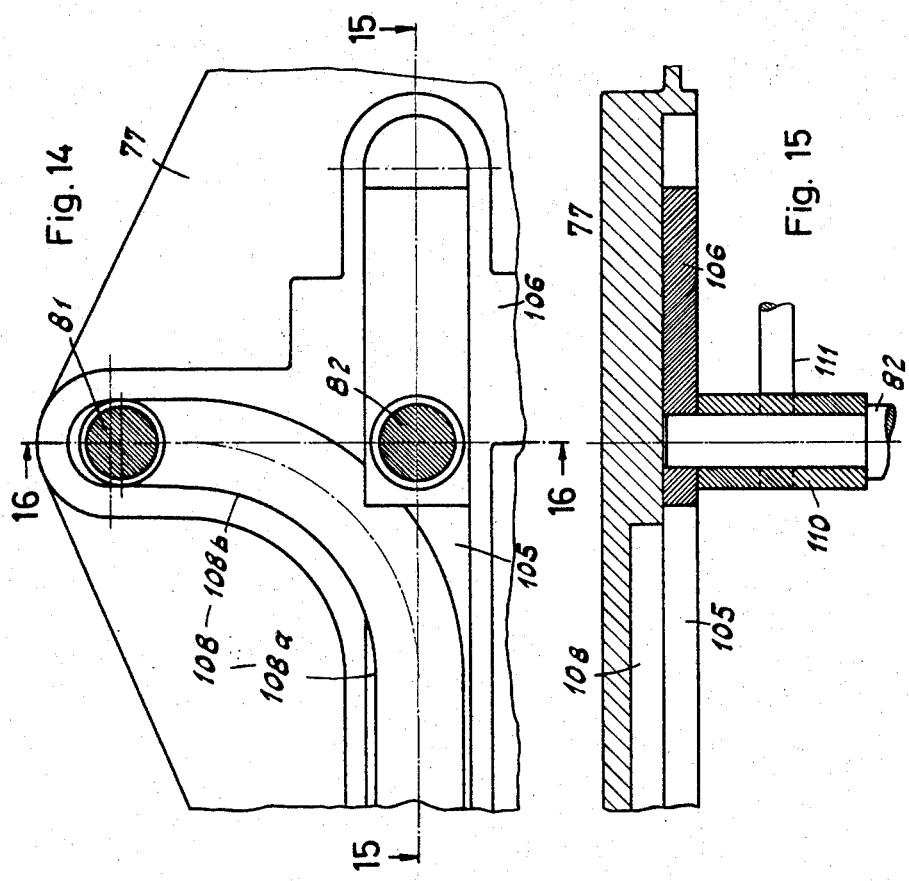

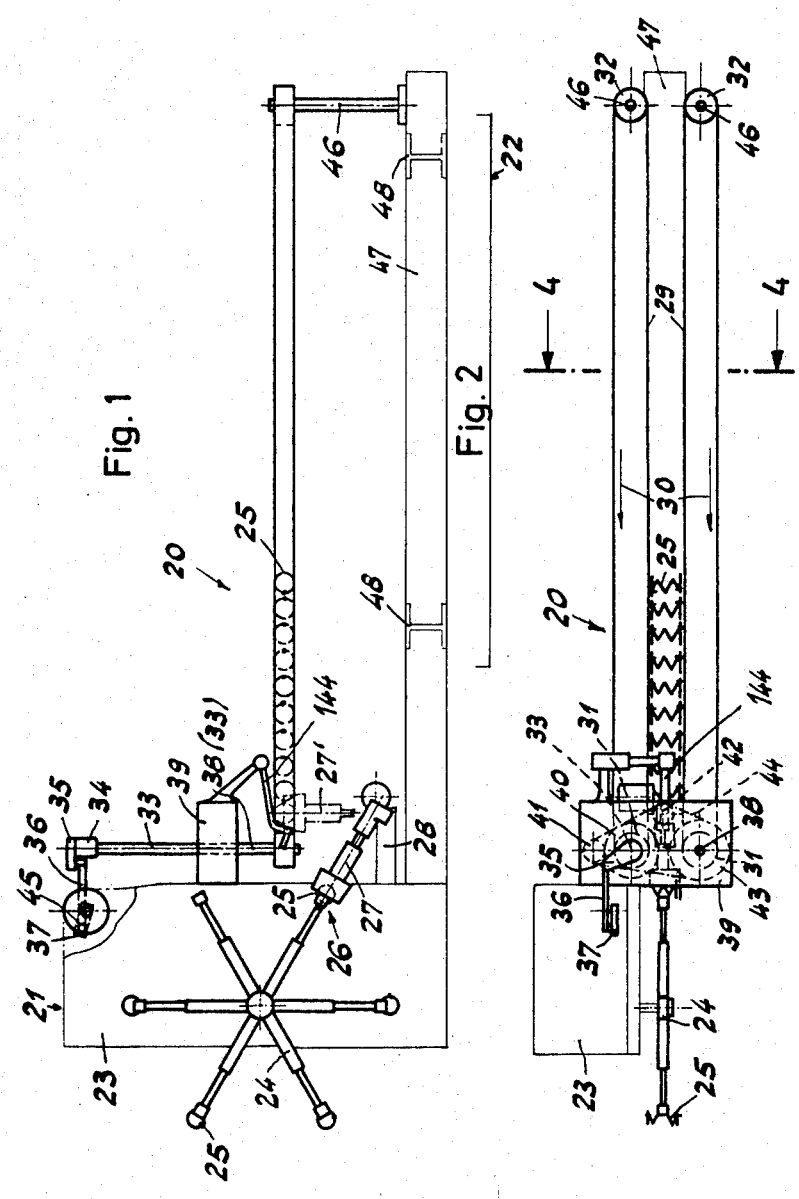

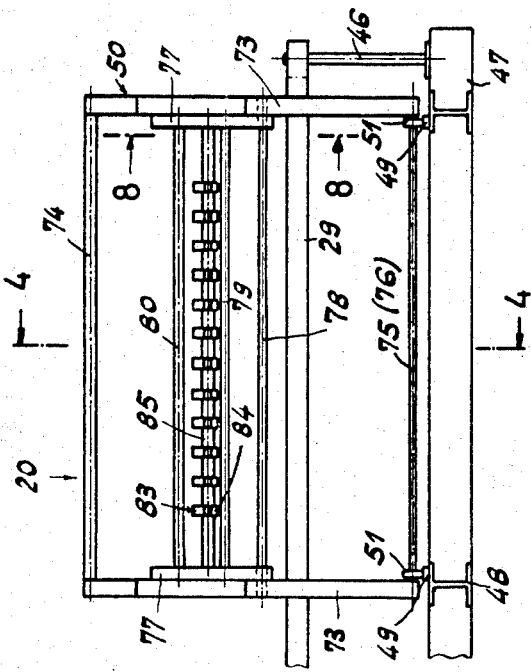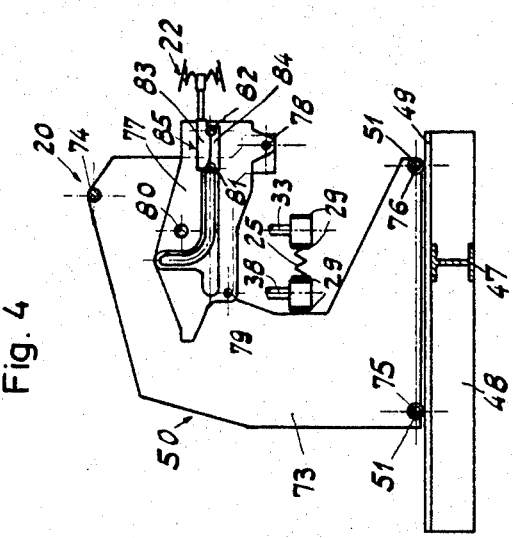

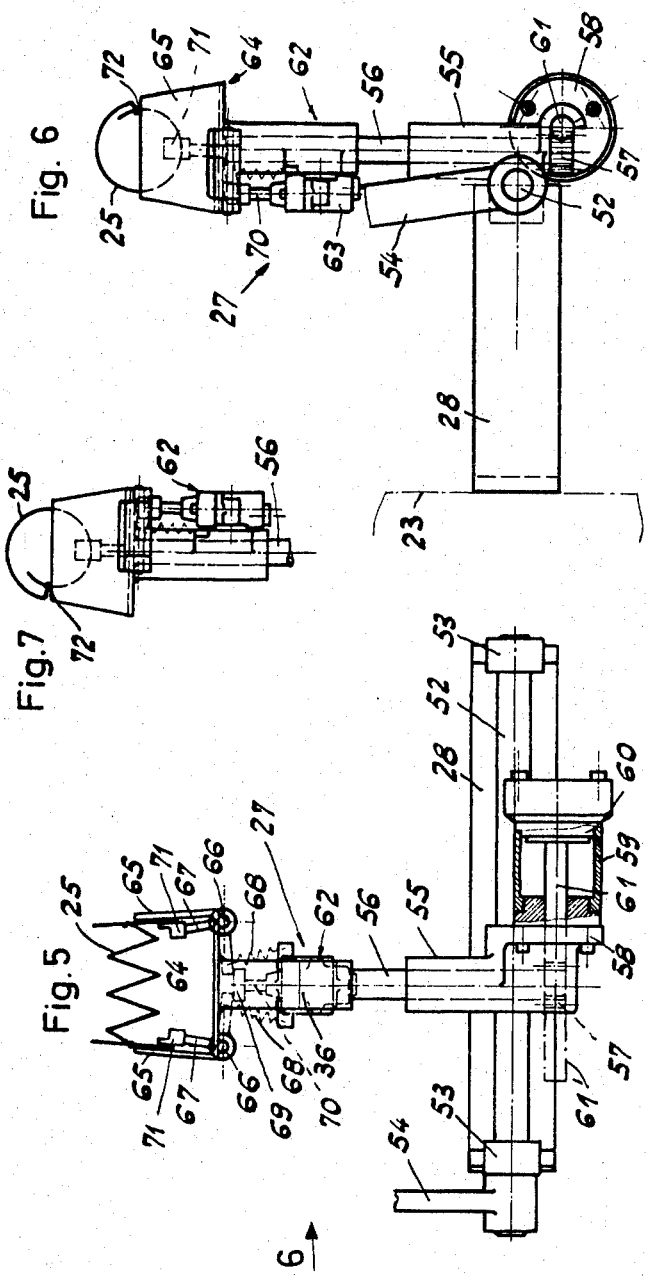

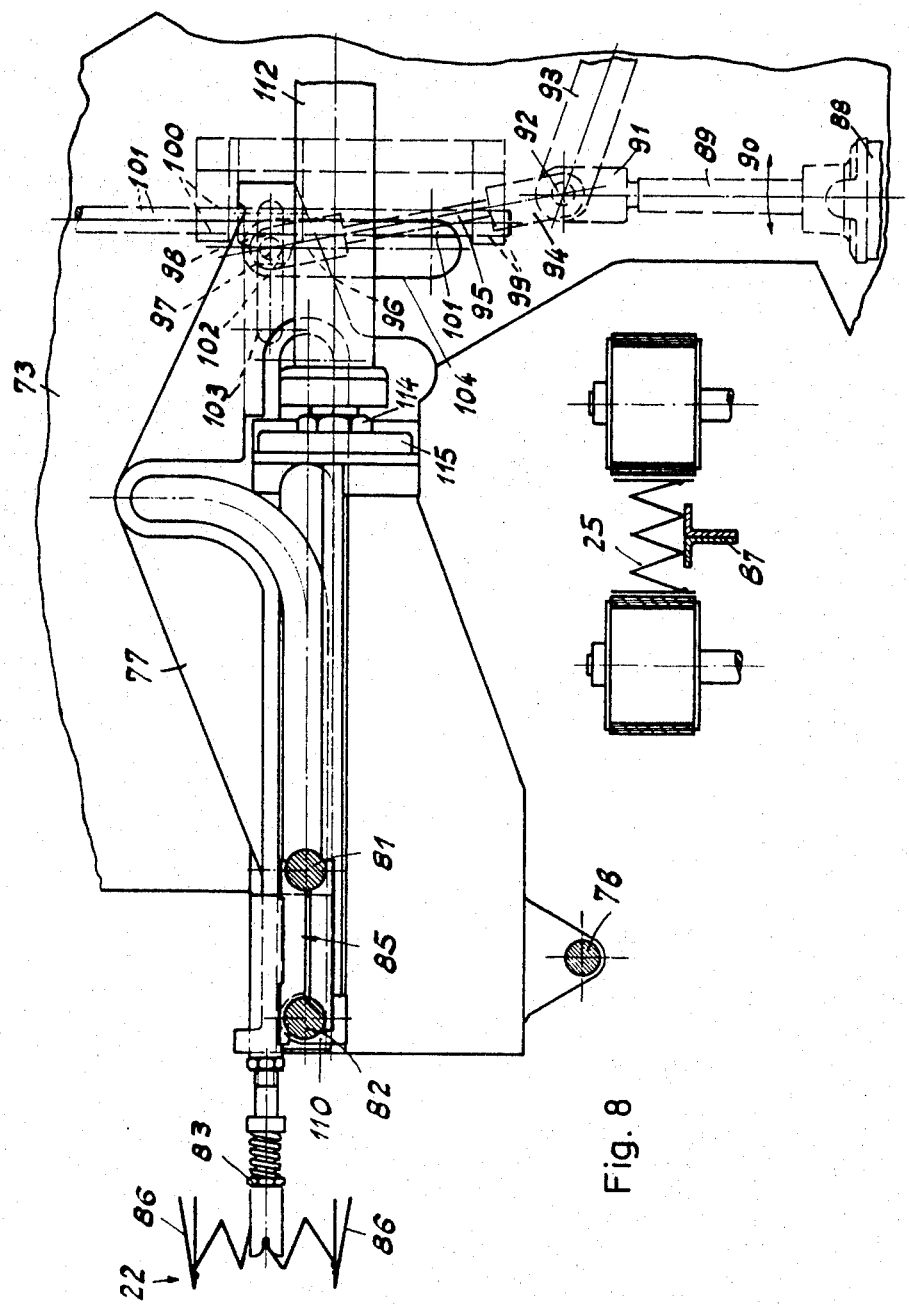

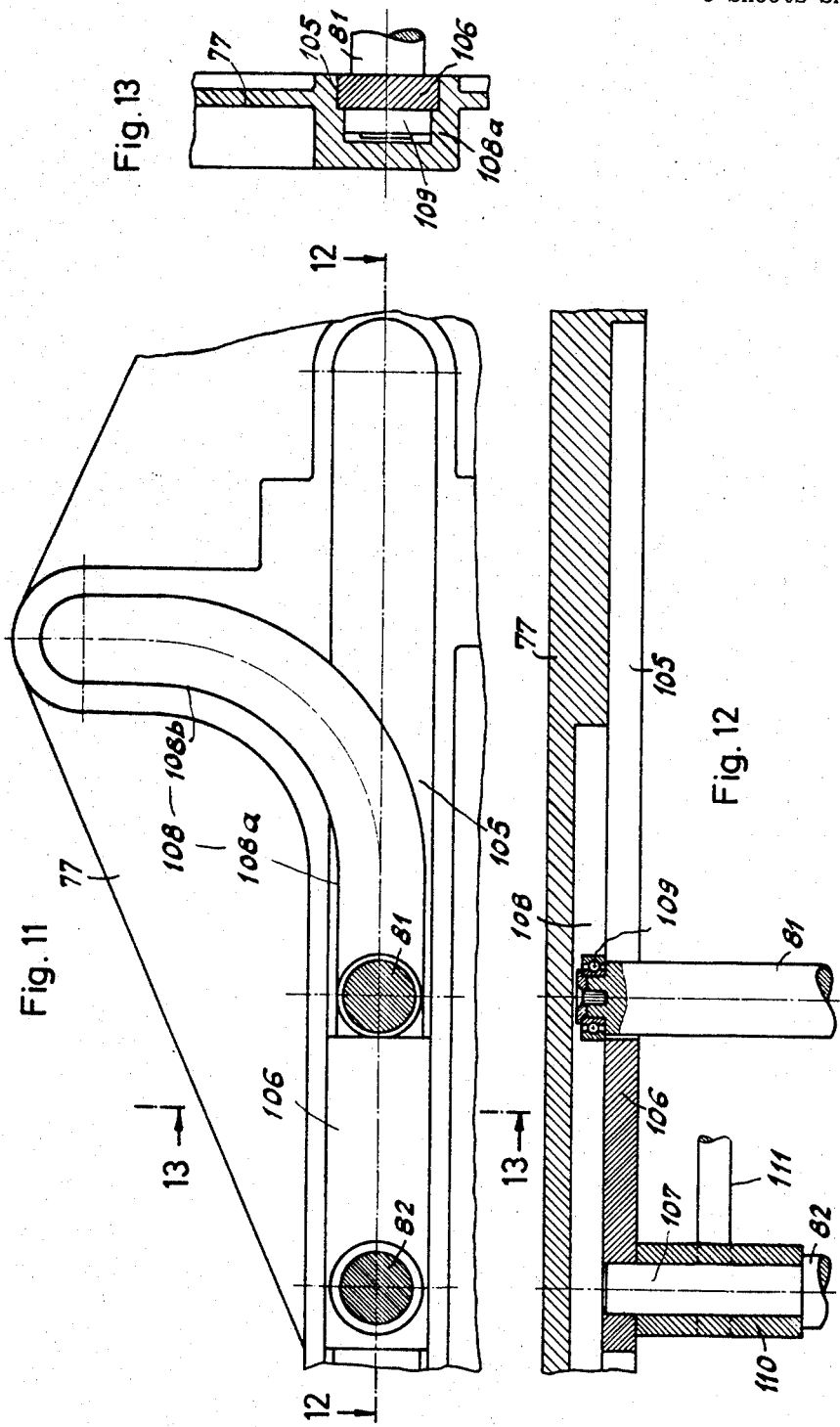

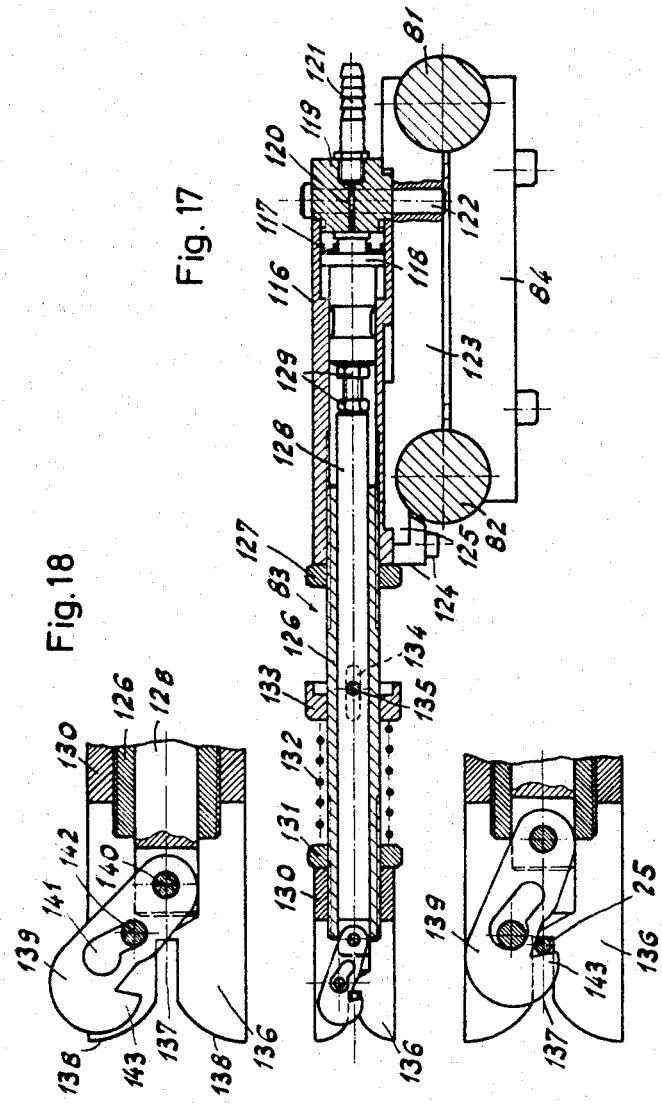

United States Patent Office 3,386,561
Patented June 4, 1968

3,386,561
MACHINES FOR MANUFACTURING
SPRING INTERIORS
Walter Spühl, Saint Gall, Switzerland, assignor to Spühl A.-G., Saint Gall, Switzerland
Filed Mar. 3, 1967, Ser. No. 620,370
Claims priority, application Germany, July 12, 1966,
S 104,756
10 Claims. (Cl. 198—32)

ABSTRACT OF THE DISCLOSURE

Apparatus for feeding a row of coil springs to a spring interior manufacturing machine has a pivoted arm which picks up springs one at a time from a spring manufacturing apparatus and wedges them between a pair of stepwise driven endless belts. A plurality of grab arms pick up a row of springs simultaneously from the belts and presents this row for acceptance by a spring interior manufacturing machine.

---

The present invention relates to machines for manufacturing spring interiors.

U.S. patent specification No. 2,388,106 describes a mechanism for feeding wire coil springs to a machine for manufacturing spring bodies, wherein this mechanism conveys the springs successively to the input of the spring body manufacturing machine by means of an endless belt, whereupon a row of springs are simultaneously fed into the machine. In the embodiment illustrated in the above U.S. patent specification, the springs have to be placed manually into separate pockets provided on the endless belt. It is also possible to load the belt automatically with the springs, wherein the springs may be placed on the belt from the output of a spring manufacturing machine. The insertion of the springs into the above-mentioned pockets would require a very complicated loading device, just as the removal of the springs from the pockets, and their insertion into the spring body manufacturing machine, requires a very complicated arrangement. A complete arrangement for manufacturing spring interiors from spring wire is described in British patent specification No. 942,972. In this arrangement a plurality of spring manufacturing arrangements, provided with special devices for the orientation of the joints in the spring end convolutions, supply a complicated feed mechanism for the spring interior manufacturing machine, which mechanism incorporates a large number of supports for each row of springs. These supports are conveyed, on a rotating track formed by rails and other conveying means, from a support magazine to the spring manufacturing arrangements where they are loaded with the springs. The supports are then conveyed to the spring body manufacturing machine where they are successively emptied and then returned to the magazine. This arrangement is very complicated. The purpose of the present invention is to attain the same object with a considerable reduction in the technical resources required, wherein the mechanical assembly technique the spring feed mechanism of the present invention allows to cooperate with known spring manufacturing arrangements and spring interior manufacturing machines which have not been specially constructed for a complete arrangement operating automatically.

According to the present invention apparatus for feeding a row of coil springs to a machine for manufacturing spring interiors comprises a spring transferring arm for extracting springs one at a time from a spring manufacturing apparatus, stepwise driven endless belt conveyor means for receiving the springs one at a time from said spring transferring arm, a plurality of gram arms each capable of releasably gripping a spring and mounted on adjustable beam means having a first position in which the grab arms are positioned for gripping a row of springs presented thereto by the conveyor means and a second position in which the springs gripped by the grab arms are presented to the spring interior manufacturing machine.

Pivotable arms for feeding springs into a spring body manufacturing machine are known from the British patent specification No. 920,544. In this case, however, an arm driven by a separate mechanism is provided for each spring in a row of springs, which arm takes the spring from a stack of springs, wherein a stack of springs is provided for each swivel-arm mechanism. The spring feed mechanism of the above-mentioned patent specification is unsuitable for achieving the present object.

The invention will be further described, by way of example, with reference to the accompanying drawings, in which:

FIG. 1 is a diagrammatic view of a fixed part of a spring feed mechanism constructed according to one embodiment of the present invention and connected to the output of a spring manufacturing arrangement;

FIG. 2 is a plan view of FIG. 1;

FIG. 3 is a diagrammatic view of a displaceable part of the spring feed mechanism not shown in FIG. 1;

FIG. 4 is a section taken on the line 4—4 in FIG. 3, corresponding to the line 4—4 in FIG. 2;

FIG. 5 is a view of spring extractor arm having a break-out;

FIG. 6 is a side elevation of FIG. 5 in the direction of arrow 6;

FIG. 7 is a detail of FIG. 6 in a different position;

FIG. 8 is a section taken on the line 8—8 in FIG. 3, drawn to a larger scale;

FIG. 11 is a detail of FIG. 8, drawn to a larger scale;

FIG. 12 is a section taken on the line 12—12 in FIG. 11;

FIG. 13 is a section taken on the line 13—13 in FIG. 11;

FIG. 14 is a portion of FIG. 11, some of the parts being in a different position;

FIG. 15 is a section taken on the line 15—15 in FIG. 14;

FIG. 16 is a section taken on the line 16—16 in FIG. 14;

FIG. 17 is a longitudinal section of a grab-arm; and

FIGS. 18 and 19 are each a detail of FIG. 17 in two different positions.

Figure 9:
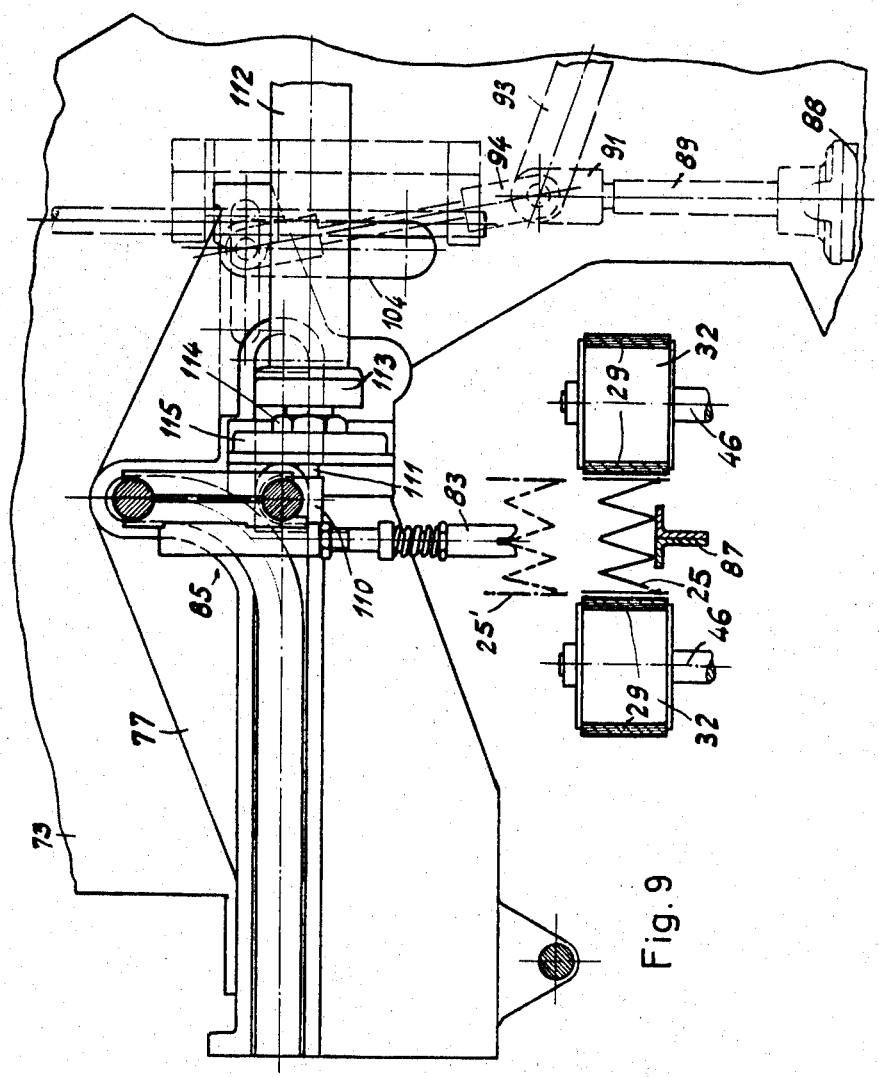
FIGS. 9 and 10 are each a section corresponding to FIG. 8, the parts being in a different position.

FIGS. 1 to 4 illustrate a mechanism 20 for feeding coil springs, made in a spring manufacturing apparatus 21, to a machine 22 which joints the coil springs to form spring interiors. Only the front end of the machine 22 is illustrated in FIGS. 2 and 4. A stand 23 and a six-armed star conveyor 24 of a spring manufacturing apparatus 21 are illustrated, which star conveyor 24 is (in FIGS. 1 to 4) stepwise conveying a coil spring 25 from a process station (not shown) to a removal station 26.

A spring removing arm 27, forming part of the mechanism 20 and pivotably mounted on a frame portion 28 attached to the stand 23, removes the spring 25 from the star conveyor 24 at the removal station 26 and places it between two parallel, endless belts 29. The belts 29 are moved stepwise in the direction of the arrows and are conducted around reversing pulleys 31 and 32. One of the pulleys 31 is mounted on the lower end of a spindle 33 vertically mounted on the stand 23, a swinging crank 35 provided with a free running mechanism 34 being mounted on the upper end of the spindle 33, which swinging crank 35 is coupled through a connecting rod 36 to a rotary crank 37 mounted on the stand 23. The rotary crank 37 is continuously driven at a speed at which it makes one complete rotation for each spring 25 conveyed to the removal station 26. During each rotation of the rotary crank 37, the swinging crank 35 makes one reciprocating movement, the spindle 33 being rotated always in one direction due to the free running mechanism 34. The other pulley 31 is attached to a spindle 38 carried in a gear box 39 mounted on the stand 23, which gear box 39 transmits the movement of the spindle 33 to the spindle 38 by means of gear and sprocket wheels 40 to 43 and a chain 44. The stroke of the swinging crank 35 may be varied by changing the pivotal point of the connecting rod 36 on the rotary crank 37, in order to vary the distance between the coil springs 25 placed between the belts 29 by the removing arm 27, corresponding to the number of springs which are to be fed side by side into the machine 22.

The reversing pulleys 32 are mounted on the upper ends of vertical columns 46 mounted by means of brackets (not illustrated) on an I beam 47 extending in the longitudinal direction of the belts 29, the I beam 47 forming a base together with two further, transversely extending I beams 48 (omitted in FIG. 2). Rollers 51 provided on a movable frame 50 rest on track rails 49 mounted on the rails 48, so that the frame 50 may be moved towards or away from the machine 22. The frame 50 carries mechanisms for grasping the springs 25 wedged between the belts 29 and feeding them into the machine 22. The construction and function of the removing arm 27 is described in greater detail with reference to FIGS. 5 to 7.

As illustrated in FIGS. 5 and 6 a spindle 52 is pivotably mounted in bearings 53 on the frame part 28 mounted on the stand 53, the spindle 52 being rigidly connected to a lever 54 which is pivoted back and forth in synchronism with the spring manufacturing apparatus 21 by, for example, a crank mechanism (not shown) or a pneumatic cylinder. The arm 27 includes a casing 55 rigidly clamped to the spindle 52 in a manner not illustrated in detail. A spindle 56 having a pinion 57 mounted on its lower end is pivotably mounted in the casing 55. A pneumatic cylinder 59 is screwed on to a tongue 58 of the casing, in which pneumatic cylinder 59 a piston 60 is displaceable whose piston rod 61 is partially constructed as a toothed rack meshing with the pinion 57.

On the upper end of the spindle 56 is mounted a head 62 having a pneumatic cylinder 63 and a U-shape chamfered plate 64 between whose arms 65 is located a spring 25. The lower, inner ends of two symmetrical bell-crank levers 67 mounted at 66 are acted on by two tension springs 68 and a head 69 mounted on the upper end of the piston rod 70 of the piston provided in the cylinder 63. The upper, outer ends of the bell-crank levers 67 are provided with claws 71 which urge the two end windings of the spring 25 against the arms 65 of the U-plate 64 when the pneumatic cylinder is charged with compressed air. The piston rod head 69 consequently urges the inner ends of the bell-crank lever 67 upwardly against the force of the tension springs 68. The compressed air is admitted to the cylinder 63 when the removing arm 27 has been pivoted towards the removing station 26 (see FIG. 1) and the star conveyor has placed a spring into the U-plate 64. When the arm 27 is pivoted towards the position 27' (indicated by dash-dot lines in FIG. 1) the spring 25 momentarily raises catch 144 rotatably mounted on an arm of the housing of the gear box 39. When the arm 27 reaches its above-mentioned end position 27', the catch 144 is returned to the illustrated position by its own weight, and the compressed air is released from the cylinder 63, so that the claws 71 release the spring 25 which is wedged between the belts 29 and retained in its position by the catch 144 when the arm 27 pivots back. At this instant, during which the free running mechanism 34 effects its return movement, the belts 29 are stationary, and they are subsequently moved a step forward by the free running mechanism 34.

The pneumatic cylinder 59 pivots the spindle through 180° by means of the pinion 57, after the removal of the spring 25 and before its delivery. As a consequence of this, the knot 72 formed on each end convolution of the springs 25 made in the spring manufacturing apparatus 21, is loacted in the position illustrated in FIG. 7, when the spring is laid between the belts 29, and the outer end of the piston rod 61 constructed as a toothed rack is located in the position indicated by dash-dot lines in FIG. 5. The ability of the head 62 of the arm 67 to pivot through 180° enables the springs 25 on the longitudinal edges of the spring body to be arranged so that their knots 72 are facing away from the longitudinal edge, an arrangement which, as is well known, is important for the protection of the cloth coverings of the spring interiors. The fitting of a frame to the spring interior is also rendered more simple thereby. If the spring interior is manufactured, for example, from rows of twelve springs arranged to be adjacent to each other, eleven springs 25 are clamped between the belts in the position illustrated in FIG. 6, and the twelfth spring 25 in the position illustrated in FIG. 7, compressed air being fed to the cylinder 59 only after the removal of each twelfth spring. Alternatively, six springs could be placed in one position between the belts and six springs in the other position, since the position of knots of the outermost springs is all that matters.

The construction of the moveable frame 50 is now described in greater detail with reference to FIGS. 3 and 4. The frame 50 has two end supports 73 rigidly connected together by traverses 74, 75 and 76. Two plates 77 are pivotally mounted on the two end supports 73 and rigidly connected together by traverses 78, 79 and 80, the ends of the traverse 78 at the same time being mounted as pivot journals in the end stands 73.

Two traverses 81 and 82, whose ends are supported on the plates 77 in a manner to be described later in more detail, are provided with grab arms 83 which, as may be seen more clearly in FIG. 17, are securely screwed to the traverses 81, 82 with the aid of clips 84, so that the parts 81 to 84 form a rigid structure hereinafter designated grab beam 85.

Figure 10:
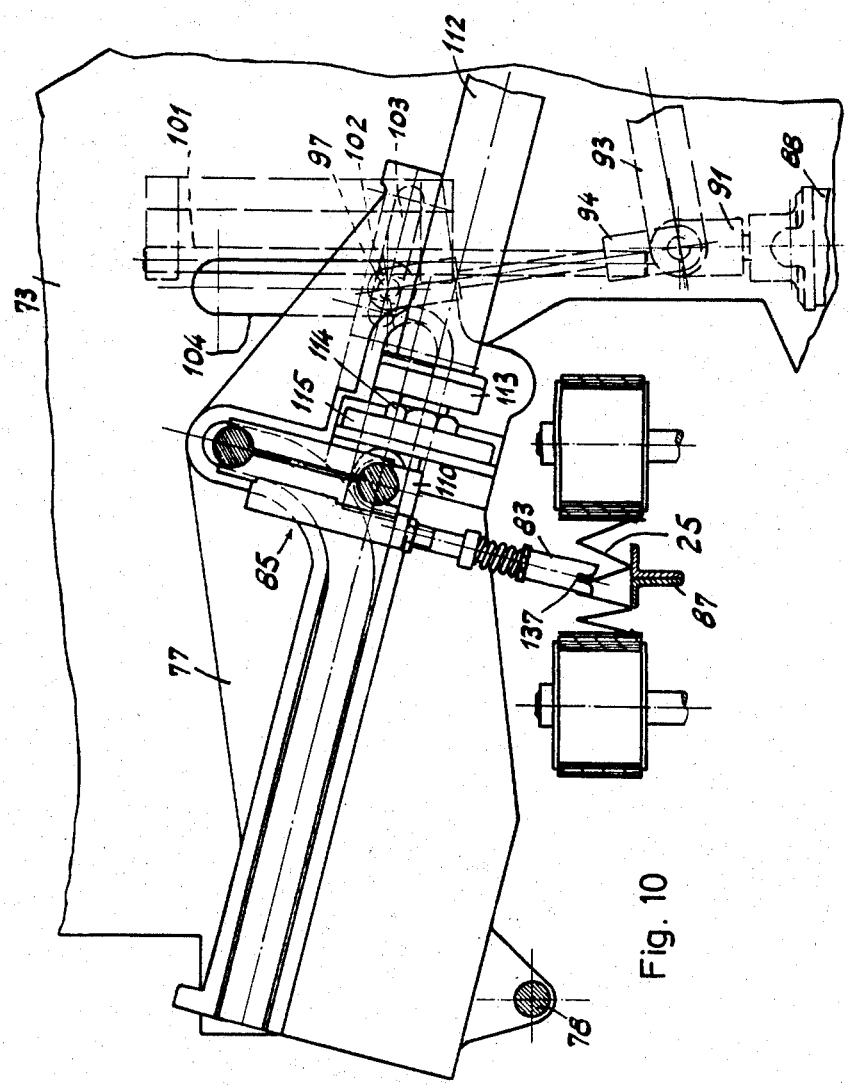

In FIG. 8 the grab beam 85 is located in its end position, as in FIG. 4, i.e., in the position in which a row of springs 25 has been inserted, by the horizontally directed grab arm 83, between two slightly convergent, narrow plates 86 extending along the front of the machine 22 and serving as its position station. The initial position of the grab beam 85 is illustrated in FIG. 9, wherein the vertically directed grab arms 83 are located above the springs clamped between the belts 29. It may be seen that the springs are also supported on a track 87 omitted in FIGS. 1 to 4. In FIG. 10, the position of the grab beam 85 relative to the plates 77 is the same as in FIG. 9, the plates 77, however, being pivoted about their spindles 78, so that the grab arms 83 are grasping the centres of the springs 25. The mechanisms effecting these movements of the plates 77 and the grab beam 85 are now to be described in greater detail.

Each plate 77 is swivelled by an associated pneumatic cylinder 88 whose lower end (not seen in FIGS. 8 to 10) is articulated to the relevant support 73, so that a piston rod 89 extending upwardly from the cylinder 88 may carry out a limited rotating movement in the direction of the double arrow 90. A lever 93 and a connecting rod head 94 are articulated to a head 91 of the piston rod 89 by means of a pin 92. The distant end (not shown) of the lever 93 is attached to a transverse swivel axis carried in the two end supports 73, which transverse swivel axis rigidly connects together the levers 93 associated with the two end supports 73 and plates 77, in order to couple together and freely synchronise the mechanisms for moving the two plates 77, and to prevent the tilting or jamming of the unit formed by the plates 77 and their traverses 78 to 80 (partially omitted in FIGS. 8 to 10) as a consequence of the cylinder 88 operating in an irregular manner.

The connecting rod head 94 is mounted on the lower end of a connecting rod 95 having a connecting rod head 96 on its upper end, the distance between the heads 94 and 96 preferably being adjustable, e.g. by screwing them on the rod 95. The upper connecting rod head 96 is articulated to a plate 98 by a pin 97, the plate 98 being attached to a rod 101 vertically conducted at 99 and 100. A slide block 102 is located on the pin 99 and slides in a groove 103 in the plate 77. Since the plate 77 and the connecting rod 94 to 96 are on different sides of the support 73, a vertical slot 104 is provided in the support 73 in order to allow the movement of the pin 97. In the top dead centre position of the piston rod 89, the plate 77 is substantially horizontal, as illustrated in FIGS. 8 and 9. If the compressed air is released from the cylinder 88, the plate 77 swings about its axis 78 into the position illustrated in FIG. 10, and the rod 101 is moved downwards in the guides 99 and 100, and the slide block 102 is moved to the left in the groove 103.

As illustrated in FIGS. 11 to 13, the plate 77 is provided with a straight groove 105 for guiding the grab beam 85, a slide block 106 being displaceable in the groove 105. An end 107 of the traverse 82 is pivotably mounted in the slide block 106. The plate 77 is also provided with a narrower and deeper groove 108, a portion 108a of which extends under the groove 106 and merges tangentially into a quadrantal portion 108b. The outer race of a ball-bearing is carried in the groove 108, and the inner race is attached to one end of the traverse 81. One end of a piston rod 111 engages a sleeve 110 mounted on the end 107 of the traverse 82 and having a lower eccentric part visible in FIG. 8. The piston of the piston rod 111 is located in a double-acting pneumatic cylinder (see FIGS. 8 to 10) whose head 113 is attached, by means of a screw-coupling, to a fin 115 projecting from the plate 77.

The grab beam 85 is moved in the following manner:
In the initial position illustrated in FIG. 9, the cylinder 88 is charged with compressed air, and the piston rod 89 is in its outer dead centre position, the piston rod 111 of the double-acting cylinder 112 being in its inner dead centre position. When the air is released from the cylinder 88, the plate 77 is no longer held by the mechanism 89 to 103 described, so that it drops into the position illustrated in FIG. 10, and the grab arms 83 grasp the spring 25 in a manner described in greater detail later. When the cylinder 88 is charged with compressed air, the plate 77 is again raised into its initial position illustrated in FIG. 9, and the springs 25 are held at the ends of the grab arms 83 in the position 25' illustrated by dash-dot lines.

The cylinder 112 is now charged with compressed air, so that the piston rod 111 comes into its outer dead centre position illustrated in FIG. 8. The piston rod 111 thereby displaces the traverse 82, guided in the groove 105 by the slide block 106, from its initial position illustrated in FIGS. 14 to 16, corresponding to the position illustrated in FIGS. 9 and 10, into its end position illustrated in FIGS. 11 to 13 corresponding to the position in FIG. 8. Since the traverses 81 and 82 are connected to the grab arms 83 by the grab beam 85 and the clips 84, the traverse 81 is conducted by the ball-bearing 109 along a path corresponding to the quadrantal groove portion 108b, so effecting a quarter turn of the beam 85 about its own axis. After the springs 25 have been placed between the plates 86 of the machine 22, the cylinder 112 is charged with compressed air, so that the piston rod 111 again comes into its inner dead centre position. The initial position illustrated in FIG. 9 is restored, and a new operating cycle may commence.

The construction and operation of the grab arms 83 are described in further detail with reference to FIGS. 17 to 19. The grab arm 83 has a pneumatic cylinder 116 in which is arranged a multi-shouldered piston 188 provided with a seal 117 which, in the inner dead centre position illustrated in FIG. 17, abuts against a cylinder head 119 provided with an air feed bore 120 and a connection piece for a hose conduit. The cylinder head 119 is articulated, by means of an eccentric pin 122, to a plate 123 screwed to the clip 84. A clamping device 124 is provided at the outer end of the cylinder 116, by means of which the cylinder 116 may be clamped to a lug 125 on the plate 123, in a position adjustable by pivoting the cylinder 116 about the pin 122.

A tube 126 is screwed into the cylinder 116 and secured by a lock nut 127. A rod 128 is carried in the tube 126 and is adjustably connected to the piston 118 at 129. A grab head 130 is screwed on to the free end of the tube 126 and secured by a lock nut 131 against which is supported a strong compression spring 132. The other end of the spring 132 abuts against a spring stop 133 attached to the rod 128 via a transverse pin 135 passing through a slot 134 in the tube 126, so that the rod 128 is held in the position illustrated in FIG. 17, when no compressed air is supplied.

The grab head 130 has a gap lying in the drawing plane of FIG. 17 and defining two equal, projecting parts 136 each of which is bifurcated by a slot 137 and provided with guide edges 138 converging towards the said slot 137. A latch 139 is arranged in the gap between the two parts 136 and is pivotable about a pin 140 mounted on the bifurcated end of the rod 128. The latch 139 has a guide slot 141 through which extends a pin 142 eccentrically attached to the projecting parts 136 of the grab head 130. The latch 141 has a hook 143 which, when the grab arm 83 is in its normal position, is located in the position illustrated in FIG. 17 in which it falls across a slot 137, as illustrated in FIG. 19.

Before the grab arm 83 reaches the position illustrated in FIG. 10, in which it is to grasp a spring 25, the cylinder is charged with compressed air, so that the rod 128 comes into the outer dead centre position of FIG. 18, and the latch is swung upwardly by the pin 142 sliding in the guide slot 141. When the position of FIG. 10 is reached, the guide edges 138 conduct a centre portion of the spring 25 into the slot 137. Before the plate 77 is again raised, the compressed air is released from the cylinder 116, so that the latch 141 returns to its position of FIG. 17, but is now gripping a spring 25. After the end position of FIG. 8 is reached, the latch 141 is re-opened in order to release the spring 25 between the plates 86 of the spring body manufacturing machine 22. The grab head 130 having the retaining latch 139 is known per se, and is also used on the ends of the arms of the star conveyor 24 of the spring manufacturing apparatus 21, for example. However, in the latter case, the retaining latch is not controlled pneumatically.

I claim:
1. Apparatus for transferring coil springs from a coil spring manufacturing apparatus to a spring interior manufacturing machine comprising:
    a spring transferring arm,
    means on said spring transferring arm for releasably holding a coil spring,
    conveyor means including a pair of endless belts adapted to wedgingly receive said coil springs therebetween,
    means mounting said transferring arm for movement of said spring holding means thereon from a spring engaging position at which same receives a spring from said coil spring manufacturing apparatus to a spring release position between said endless belts,
    means for driving said endless belts in a stepwise fashion, means operable in synchronism with the last-mentioned means for reciprocating said transferring arm between said positions thereof, a plurality of grab arms, means on each of said grab arms for releasably gripping one of said springs, means mounting said grab arms for simultaneous movement of said gripping means thereon from a first position at which same grips a row of springs built up between said endless belts to a second position at which said row of springs is presented to said spring interior manufacturing machine, and means for moving said grab arms from said first to said second position thereof when a row of springs has been built up between said endless belts by said transferring arm.

2. Apparatus according to claim 1 in which said spring transferring arm itself comprises:

a rotatable rod and wherein said releasable spring holding means comprises:

a head, mounted on said rotatable rod, elements on said head for releasably holding a coil spring with its axis perpendicular to the axis of said rod, a first pneumatic cylinder and piston mechanism on said transferring arm for actuating said elements, a second pneumatic cylinder and piston mechanism, and a rack and pinion mechanism operative between said second cylinder and piston mechanism and said rotatable rod for rotating said rod through substantially 180° to enable the first and final springs of a row to be wedged between said endless belts with the knots of said first and final springs offset relative to each other by 180°.

3. Apparatus according to claim 2 in which said elements on said head comprise:

a U-shaped member, two symmetrical bell-crank levers for trapping and releasing a coil spring against the legs of the U-shaped member, and two compression springs acting between said head and said bell-crank levers, the bell-crank levers being acted upon by said first pneumatic cylinder and piston and said two compression springs.

4. Apparatus according to claim 1 further comprising:

displaceable plates supporting said means mounting said grab arms, first traverses connecting together said plates, frame means for pivotably supporting said plates, third and fourth pneumatic cylinder and piston mechanisms for pivoting said plates, interconnected levers for coupling together said pistons of said third and fourth pneumatic cylinders for common movement thereof, and fifth and sixth pneumatic cylinder and piston mechanisms provided on said plates or angularly displacing said means mounting said grab arms relative to said plates.

5. Apparatus according to claim 4 in which said means mounting said grab arms comprises:

second traverses, clips, for rigidly connecting together said second traverses, and in which grooves are provided in said plates for carrying the ends of said second traverses such that, when said fifth and sixth cylinders are actuated, said means mounting said grab arms not only makes a rectilinear movement relative to said plates but also rotates about its own axis.

6. Apparatus according to claim 5, in which said grab arms comprise:

a head portion, a seventh pneumatic cylinder and piston mechanism contained in said head portion, and latch means provided in said head portion and actuable by said seventh piston.

7. Apparatus according to claim 6 further comprising:

preadjusting means for said grab arms.

8. Apparatus according to claim 7 in which said adjusting means comprises:

a plate attached to one of said clips and pivotably and clampingly supporting said grab arms.

9. Apparatus according to claim 8 further comprising:

rollers for supporting said frame such that said frame is displaceable towards and away from said spring interior manufacturing machine.

10. Apparatus according to claim 1 in which said means driving said endless belts comprises:

a rotary crank mounted to the coil spring manufacturing machine and adapted to be driven thereby, a connecting rod coupled to said rotary crank, a swinging crank coupled to said connecting rod, a one-way transmission mechanism coupled to said pivot crank, a first spindle driven by said one-way transmission mechanism, a first drive reversing pulley mounted on said spindle for driving one said endless belt, a second spindle, a gear box for driving said second spindle from said first spindle, and a second drive reversing pulley mounted on said second spindle for driving a second said endless belt.

References Cited

UNITED STATES PATENTS 1,861,429   5/1932   Schneider _____ 53—114

EDWARD A. SROKA, *Primary Examiner.*